(12) United States Patent
Morand et al.

(10) Patent No.: US 11,639,248 B2
(45) Date of Patent: May 2, 2023

(54) BAG ROLL CASSETTE AND METHOD OF USE

(71) Applicant: INTERNATIONAL REFILLS COMPANY LTD, Welches Christ Church (BB)

(72) Inventors: Michel Morand, Montreal (CA); Maurice Pinsonnault, Québec (CA)

(73) Assignee: INTERNATIONAL REFILLS COMPANY LTD, Christ Church (BB)

( * ) Notice: Subject to any disclaimer, the term of this patent is extended or adjusted under 35 U.S.C. 154(b) by 0 days.

(21) Appl. No.: 17/511,950

(22) Filed: Oct. 27, 2021

(65) Prior Publication Data

US 2022/0119156 A1 Apr. 21, 2022

Related U.S. Application Data

(63) Continuation of application No. 16/603,113, filed as application No. PCT/IB2018/058402 on Oct. 26, 2018.

(Continued)

(51) Int. Cl.
*B65D 33/00* (2006.01)
*B65D 83/08* (2006.01)
(Continued)

(52) U.S. Cl.
CPC ....... *B65D 33/002* (2013.01); *B65D 83/0805* (2013.01); *B65F 1/062* (2013.01); *B65B 43/14* (2013.01)

(58) Field of Classification Search
CPC ................ B65D 33/02; B65D 83/0805; B65D 33/1608; B65D 65/40; B65D 25/10;
(Continued)

(56) References Cited

U.S. PATENT DOCUMENTS 3,762,542 A * 10/1973 Grimes .................... A61J 9/008
206/390
3,961,743 A 6/1976 Hollowell
(Continued)

FOREIGN PATENT DOCUMENTS

BE 1020006 A3 3/2013
GB 2203127 A 10/1988
(Continued)

OTHER PUBLICATIONS

European Search Report for corresponding application EP 18 87 5105; Date of Completion Dec. 9, 2020.
(Continued)

*Primary Examiner* — Chun Hoi Cheung
(74) *Attorney, Agent, or Firm* — Cantor Colburn LLP (57) ABSTRACT

There is disclosed a bag having a tubular body with a top open end and a bottom closed end. The tubular body has a larger open diameter at the top open end. The tubular body narrows into a narrower open diameter adjacent to a bottom closed end. The tubular body in a flattened two-fold condition has a pair of side edges extending from a top edge to a bottom edge. The top edge delimits the top open end. The bottom edge delimits the bottom closed end. The pair of side edges are generally parallel to one another in a first portion adjacent to the top edge.

16 Claims, 9 Drawing Sheets

Related U.S. Application Data (60) Provisional application No. 62/734,014, filed on Sep. 20, 2018, provisional application No. 62/577,469, filed on Oct. 26, 2017.

(51) Int. Cl.
  *B65F 1/06* (2006.01)
  *B65B 43/14* (2006.01)

(58) Field of Classification Search
  CPC ......... B65F 1/062; B65F 1/0006; A61J 9/001; A61J 9/008
  USPC ...................................... 206/390; 383/35, 37
  See application file for complete search history.

(56) References Cited

U.S. PATENT DOCUMENTS

| | | | |
|---|---|---|---|
| 4,345,712 A | 8/1982 | Gim | |
| 4,611,350 A | 9/1986 | Kaczerwaski | |
| 4,721,226 A * | 1/1988 | Yurko | B65F 1/062 |
| | | | 220/495.07 |
| 4,869,391 A | 9/1989 | Farrington | |
| 4,938,608 A | 7/1990 | Espinosa | |
| 5,115,935 A * | 5/1992 | Lemongelli | B65F 1/062 |
| | | | 220/495.07 |
| 5,497,913 A * | 3/1996 | Baker | A61C 9/0026 |
| | | | 222/541.6 |
| 7,168,591 B1 * | 1/2007 | Miller | B65F 1/062 |
| | | | 220/495.07 |
| 7,252,194 B2 * | 8/2007 | Tracy | B65D 25/10 |
| | | | 242/588.4 |
| 10,889,434 B2 * | 1/2021 | Mandelbaum | B65F 1/062 |
| 2003/0053720 A1 | 3/2003 | Smith | |
| 2003/0121923 A1 | 7/2003 | Morand | |
| 2005/0092753 A1 * | 5/2005 | Best | A47F 9/042 |
| | | | 220/495.07 |
| 2018/0003547 A1 | 1/2018 | Ten Kate | |
| 2018/0354716 A1 * | 12/2018 | Mandelbaum | B65D 83/0894 |

FOREIGN PATENT DOCUMENTS

| | | |
|---|---|---|
| JP | 11116002 A | 4/1999 |
| JP | 2001139103 A | 5/2001 |
| JP | 2003285901 A | 10/2003 |
| WO | 2010060909 A1 | 6/2010 |
| WO | 2012034235 A1 | 3/2012 |

OTHER PUBLICATIONS

International Search Report for corresponding application PCT/IB2018/058402 filed Oct. 26, 2018; dated Jun. 7, 2019.
Written Opinion for corresponding application PCT/IB2018/058402 filed Oct. 26, 2018; dated Jun. 7, 2019.
Russian Office Action for corresponding application 2020117068/11(028442), filed Oct. 26, 2018; Report dated Feb. 8, 2022.

* cited by examiner

BAG ROLL CASSETTE AND METHOD OF USE

CROSS-REFERENCE TO RELATED APPLICATION

The present application is a continuation of U.S. patent application Ser. No. 16/603,113, filed on Oct. 4, 2019, which is an application under 35 USC 371 of PCT Application No. PCT/IB2018/058402, filed on Oct. 26, 2018, and which claims the priorities of U.S. Patent Application Ser. No. 62/577,469, filed on Oct. 26, 2017 and incorporated herein by reference, and U.S. Patent Application Ser. No. 62/734,014, filed on Sep. 20, 2018 and incorporated herein by reference.

TECHNICAL FIELD

The present application pertains to bag rolls as used in waste-disposal units, such as garbage cans, pails, composts, etc.

BACKGROUND OF THE ART

Disposal units, such as garbage cans, pails, composts, recycling bins are conventionally configured to support a bag. For convenience and cost-effective packaging, the bags are commonly part of a bag roll, with the bags interconnected one to another. In a particular configuration, bag rolls are stored in a bottom of a pail or wire rack, and a free end of the bag roll is raised to be supported open at a top end of the pail or wire rack. Accordingly, when a bag is full of waste or other items, the filled bag may be removed for the next bag in the roll to be deployed for receiving waste. However, as bags are filled with waste, they increase in volume and may be hard to remove from a pail or wire rack, especially if the filled bags are to be pulled upwardly out of the pail.

SUMMARY

It is an aim of the present disclosure to provide a novel bag roll.

In accordance with a first embodiment of the present disclosure, there is provided a bag comprising a tubular body with a top open end and a bottom closed end, the tubular body having a larger open diameter at the top open end, the tubular body narrowing into a narrower open diameter adjacent to a bottom closed end, and the tubular body in a flattened two-fold condition having a pair of side edges extending from a top edge to a bottom edge, the top edge delimiting the top open end, the bottom edge delimiting the bottom closed end, wherein the pair of side edges are generally parallel to one another in a first portion adjacent to the top edge.

Further in accordance with the first embodiment, for example, the pair of side edges are generally parallel to one another in a second portion adjacent to the bottom edge.

Still further in accordance with the first embodiment, for example, the pair of side edges form a taper from the first portion to the second portion.

Still further in accordance with the first embodiment, for example, at least one weld seam causes the narrowing in the taper and in the second portion.

Still further in accordance with the first embodiment, for example, a pair of the at least one weld seam cause the narrowing in the taper and in the second portion.

Still further in accordance with the first embodiment, for example, a cutout adjacent is to the weld seam.

Still further in accordance with the first embodiment, for example, at least one weld seam causes the narrowing in the taper and in the second portion.

Still further in accordance with the first embodiment, for example, a pair of the at least one weld seam cause the narrowing in the taper and in the second portion.

Still further in accordance with the first embodiment, for example, a flap is adjacent to the at least one weld seam, the flap excluded from the open diameter.

Still further in accordance with the first embodiment, for example, the tubular body is made of at least two layers of film.

Still further in accordance with the first embodiment, for example, at least one of the layers is an ethylene vinyl alcohol.

Still further in accordance with the first embodiment, for example, at least one of the layers is made of at least one of polyethylene, bioplastic, polyactic acid, starch-base, plant-base.

Still further in accordance with the first embodiment, for example, the top edge in the flattened two-fold condition has a sine waveform shape.

Still further in accordance with the first embodiment, for example, the bottom edge in the flattened two-fold condition has a sine waveform shape.

Still further in accordance with the first embodiment, for example, the bag is configured for being hung to a tubular bag support of a disposal unit, the tubular bag support having an inner circumference C and a wall thickness T, the open diameter D being in accordance with $(C_S/\pi+2T) < D < 1.05\ (C_S/\pi+2T)$.

Still further in accordance with the first embodiment, for example, a relation between the flattened two-fold width WA of the larger open diameter and the flattened two-fold width WC of the narrower open diameter is expressed as $0.60WA \leq WC \leq 0.95WA$.

Still further in accordance with the first embodiment, for example, the bag is configured for being hung to a tubular bag support of a disposal unit, the tubular bag support having an outer circumference $C_O$, the bag having the flattened two-fold width WA of the larger open diameter in accordance with: $C_O/2 \leq WA \leq 1.05(C_O/2)$.

Still further in accordance with the first embodiment, for example, the bag is configured for being hung to a tubular bag support of a disposal unit, the tubular bag support having an inner circumference C and a wall thickness T, the bag having the flattened two-fold width WA of the larger open diameter in accordance with: $\pi/2\ (C_S/\pi+2T) \leq WA \leq 1.05\ \pi/2\ (C_S/\pi+2T)$.

In accordance with a second embodiment of the present disclosure, there is provided a bag roll comprising: a plurality of the bag according to the first embodiment, wherein the bags are connected end to end and from the bottom edge of a first of the bags in the bag roll, to the top edge of a second of the bags in the bag roll.

Further in accordance with the second embodiment, for example, the bag roll is in a receptacle of a cassette body, a free end of the bag roll exiting the cassette body from a top opening in the receptacle.

In accordance with a third embodiment of the present disclosure, there is provided a bag roll for being hung to tubular bag support of a disposal unit, the tubular bag support having an inner circumference C and a wall thickness T, the bag roll comprising: a plurality of bags connected end to end and bottom to top, each one of the bags having an open diameter D in accordance with: $(C_S/\pi+2T)<D<1.05(C_S/\pi+2T)$.

Further in accordance with the third embodiment, for example, the bags are made of a continuous tubular body separated by a weld seam and a tear line at a bottom edge of each of the bags.

Still further in accordance with the third embodiment, for example, the tubular body is made of at least two layers of film.

Still further in accordance with the third embodiment, for example, at least one of the layers is an ethylene vinyl alcohol.

Still further in accordance with the third embodiment, for example, at least one of the layers is made of at least one of polyethylene, bioplastic, polyactic acid, starch-base, plant-base.

Still further in accordance with the third embodiment, for example, a top edge of each of the bags in a flattened two-fold condition has a sine waveform shape.

Still further in accordance with the third embodiment, for example, a bottom edge in the flattened two-fold condition has a sine waveform shape.

In accordance with a fourth embodiment of the present disclosure, there is provided a bag roll comprising a plurality of bags connected end to end and bottom to top, the plurality of the bags having a larger section adjacent to a top open end and a narrower section adjacent to a bottom closed end, a relation between a flattened two-fold width WA of the larger section and a flattened two-fold width WC of the narrower section being expressed as $0.60WA \leq WC \leq 0.95WA$.

Further in accordance with the fourth embodiment, for example, the bags are made of a continuous tubular body separated by a weld seam and a tear line at a bottom edge of each of the bags.

Still further in accordance with the fourth embodiment, for example, the tubular body is made of at least two layers of film.

Still further in accordance with the fourth embodiment, for example, at least one of the layers is an ethylene vinyl alcohol.

Still further in accordance with the fourth embodiment, for example, at least one of the layers is made of at least one of polyethylene, bioplastic, polyactic acid, starch-base, plant-base.

Still further in accordance with the fourth embodiment, for example, a top edge of each of the bags in a flattened two-fold condition has a sine waveform shape.

Still further in accordance with the fourth embodiment, for example, a bottom edge in the flattened two-fold condition has a sine waveform shape.

In accordance with a fifth embodiment of the present disclosure, there is provided a bag roll for being hung to tubular bag support of a disposal unit, the tubular bag support having an outer circumference $C_o$, the bag roll comprising: a plurality of bags connected end to end and bottom to top, each one of the bags having a flattened two-fold width WA at least adjacent to a top open end of the bag in accordance with: $C_o/2 \leq WA \leq 1.05(C_o/2)$.

Further in accordance with the fifth embodiment, for example, the bags are made of a continuous tubular body separated by a weld seam and a tear line at a bottom edge of each of the bags.

Still further in accordance with the fifth embodiment, for example, the tubular body is made of at least two layers of film.

Still further in accordance with the fifth embodiment, for example, at least one of the layers is an ethylene vinyl alcohol.

Still further in accordance with the fifth embodiment, for example, at least one of the layers is made of at least one of polyethylene, bioplastic, polyactic acid, starch-base, plant-base.

Still further in accordance with the fifth embodiment, for example, a top edge of each of the bags in a flattened two-fold condition has a sine waveform shape.

Still further in accordance with the fifth embodiment, for example, a bottom edge in the flattened two-fold condition has a sine waveform shape.

In accordance with a sixth embodiment of the present disclosure, there is provided a bag roll for being hung to tubular bag support of a disposal unit, the tubular bag support having an inner circumference C and a wall thickness T, the bag roll comprising: a plurality of bags connected end to end and bottom to top, each one of the bags having at least a top open section with a flattened two-fold width WA in accordance with: $\pi/2\ (C_S/\pi+2T) \leq WA \leq 1.05\ \pi/2\ (C_S/\pi+2T)$.

Further in accordance with the sixth embodiment, for example, the bags are made of a continuous tubular body separated by a weld seam and a tear line at a bottom edge of each of the bags.

Still further in accordance with the sixth embodiment, for example, the tubular body is made of at least two layers of film.

Still further in accordance with the sixth embodiment, for example, at least one of the layers is an ethylene vinyl alcohol.

Still further in accordance with the sixth embodiment, for example, at least one of the layers is made of at least one of polyethylene, bioplastic, polyactic acid, starch-base, plant-base.

Still further in accordance with the sixth embodiment, for example, a top edge of each of the bags in a flattened two-fold condition has a sine waveform shape.

Still further in accordance with the sixth embodiment, for example, a bottom edge in the flattened two-fold condition has a sine waveform shape.

DETAILED DESCRIPTION

Figure 1:
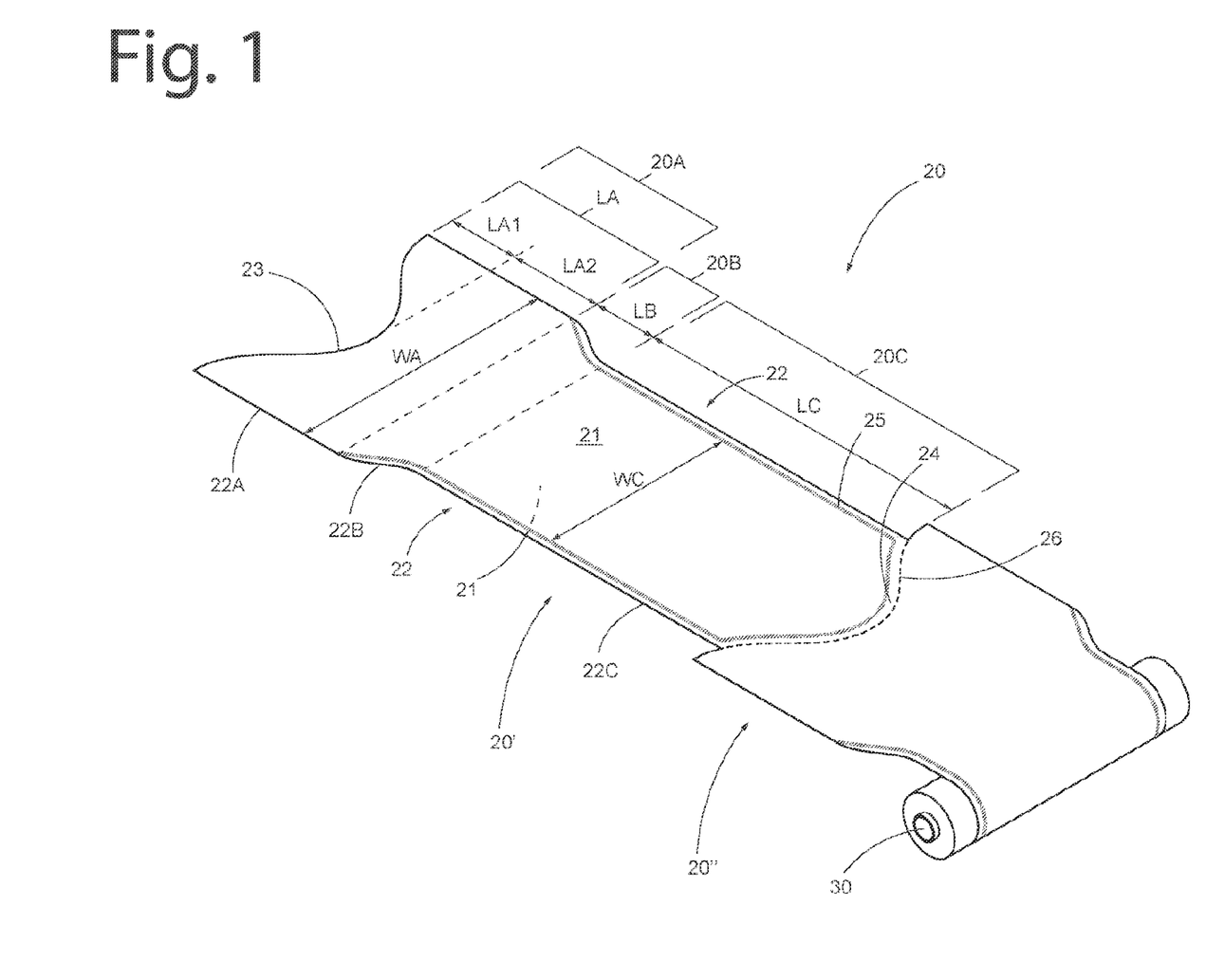
FIG. 1 is a perspective view of a bag roll in accordance with an embodiment of the present disclosure.
Figure 2:
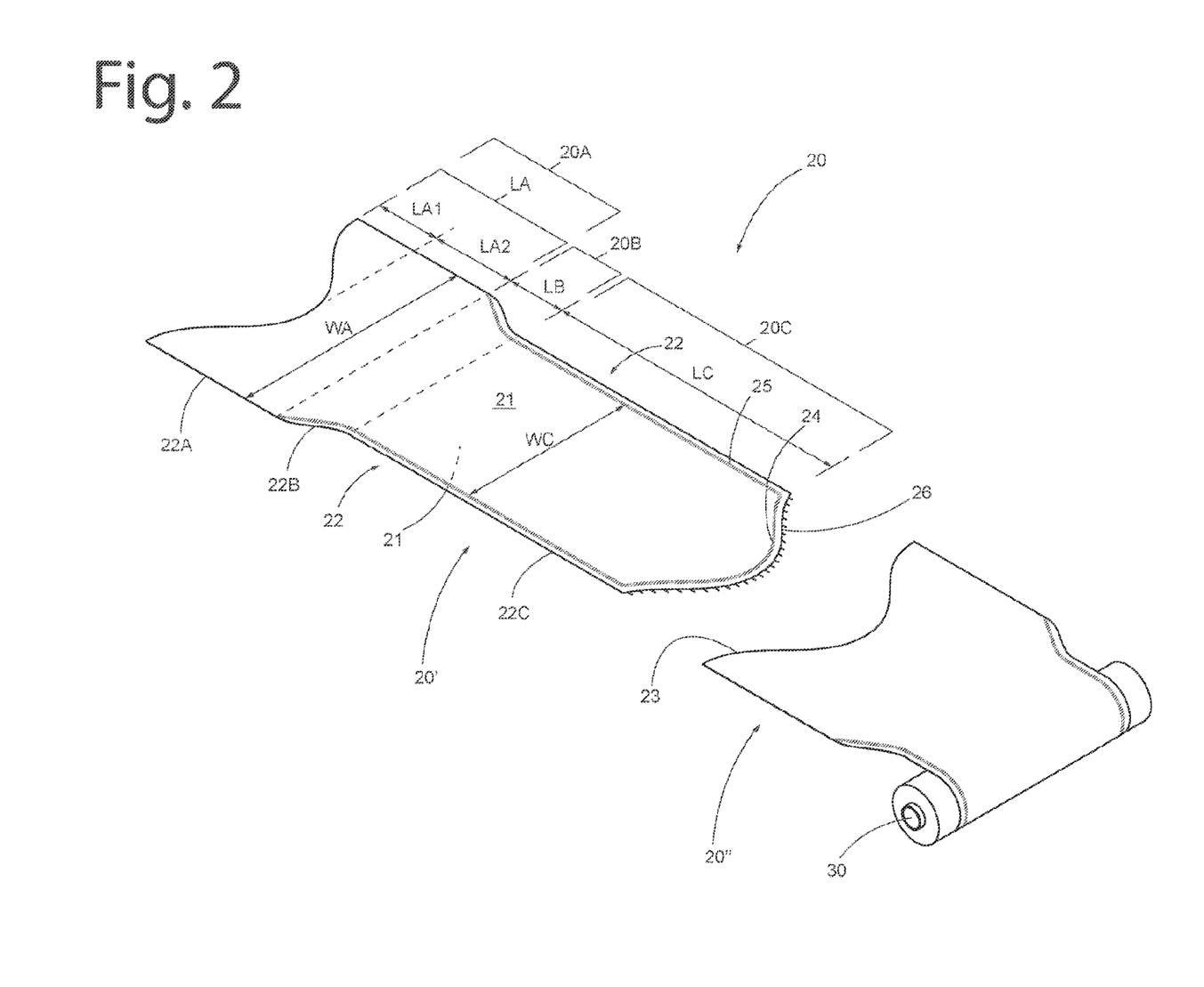
FIG. 2 is a perspective view of the bag roll of FIG. 1, with a bag detached from the bag roll.
Figure 3:
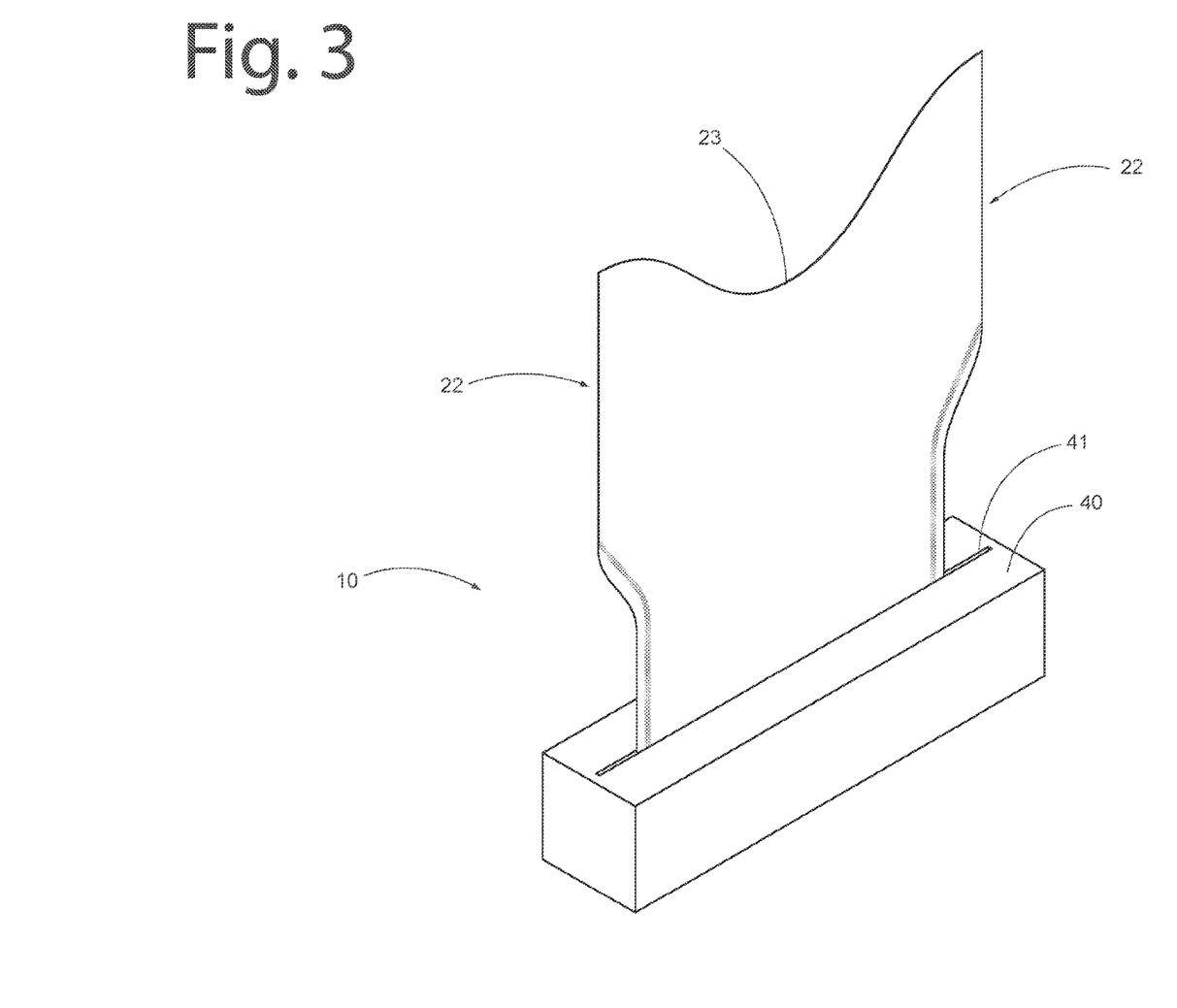
FIG. 3 is a perspective view of a bag roll cassette in accordance with the present disclosure, including for instance the bag roll of FIG. 1.

Referring to the drawings and more particularly to FIGS. 1 to 3, a bag roll cassette is generally shown at 10 (FIG. 3).

The bag roll cassette 10 may have a bag roll 20, rolled onto a tube 30, and inserted into a cassette body 40 (FIG. 3). The bag roll 20 in accordance with the present disclosure may also be with or without the tube 30 and/or the cassette body 40.

The bag roll 20 is shown in greater detail in FIGS. 1 and 2. The bag roll 20 may be made of a film of plastic material. For example, depending on the contemplated use, the plastic material may be of plastics such as polyethylene (LDPE, LLDPE or HDPE), bioplastics, polylactic acid, to name a few of numerous possible materials. It is also contemplated to add functional layers to the plastic film, such as ethylene vinyl alcohol, for the film to form an odor barrier, or a nylon layer to reinforce the bag. The film may also be biodegradable and/or compostable material, such as starch-based or plant-based materials.

The bag roll 20 may be in the form of a length of tubular film, with weld lines and tear-off perforations delimiting a plurality of bags interconnected end to end, as shown as 20', 20" and so on. The tubular film may be accumulated on a roll, in a zig-zag pattern, etc. The bag roll 20 may consequently appear to be a continuous sheet as in FIGS. 1 and 2 due to the thinness of the film, though the bag roll 20 has a pair of panels 21 overlaid onto one another, and joined at side edges 22. In an embodiment, this is referred to as a flattened two-fold condition of the bags: the bags have two folds, i.e., one at each side edge 22, and no gusset. Although the bags in the bag roll 20 could have gussets in accordance with the present disclosure, the transverse dimensions of the bag may be described herein as being in the flattened two-fold condition. This may be construed as meaning that, even if the bag roll 20 has gussets, the dimensions are for the transverse dimensions of the bag as if it were in a flattened two-fold condition. Even though the bags described herein may not be packaged or sold in the flattened two-fold condition (it may have even more folds, e.g., folded on itself), the flattened two-fold condition is the condition in which the bags are laid flat on a surface so as to have two lateral folds—two side edges—, between the top edge and the bottom edge. Moreover, reference is made to the bag as being unstretched. This may be construed as meaning that the bags are in their initial condition on the bag roll 20 prior to having a user handle the bags prior to installing same on a disposal unit, which may entail some elastic deformation or plastic deformation. The bags in their initial condition on the bag roll 20 may have been plastically prestretched in manufacturing, but in spite of such prestretching their condition on the bag roll 20 is said to be unstretched.

Figure 7:
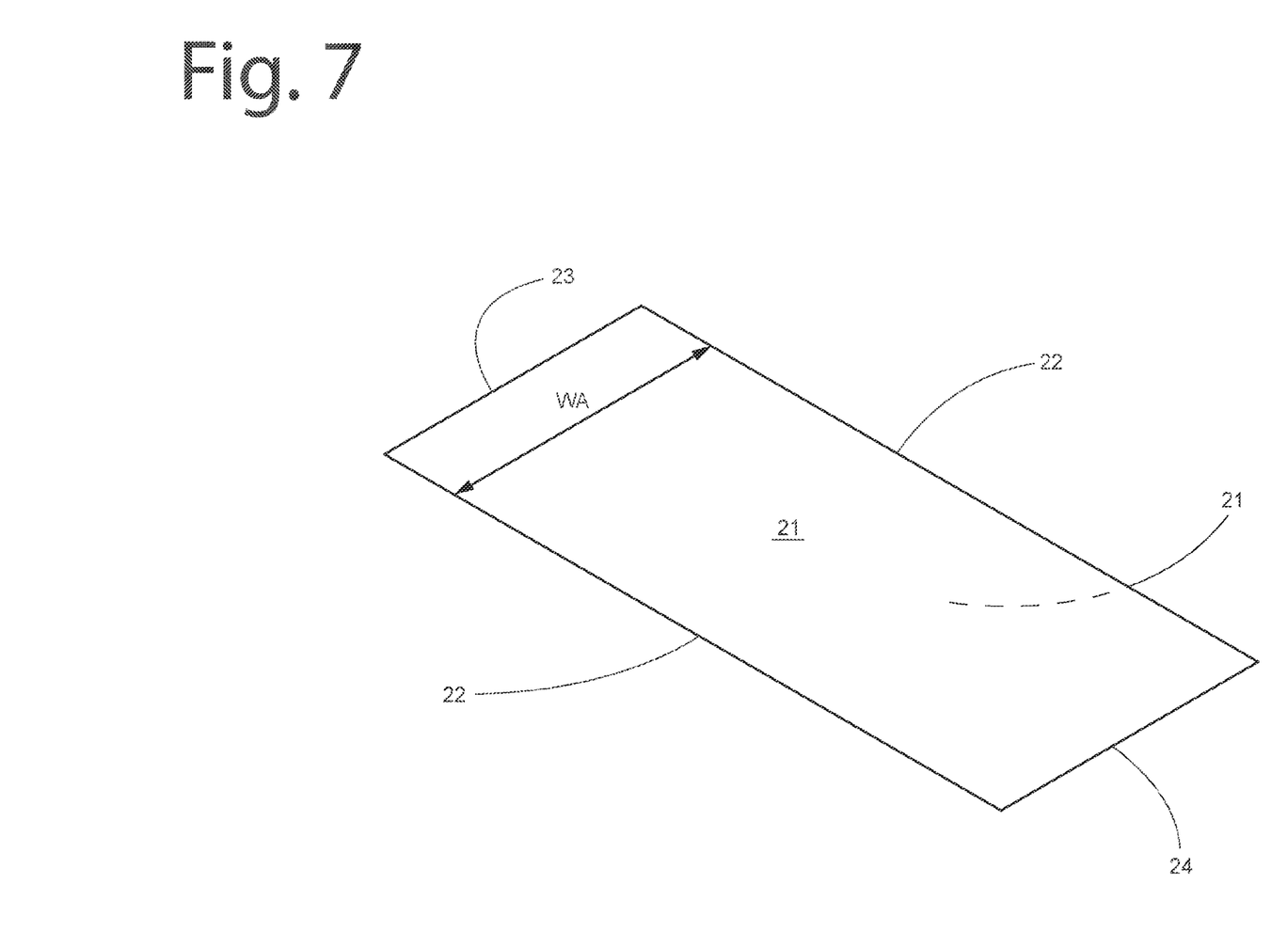
FIG. 7 is a front view of a bag of the bag roll in accordance with another embodiment of the present disclosure.

The side edges 22 of each bag extend from a top edge 23 to a bottom edge 24 of each bag, such as bag 20'. In the end-to-end connection of the bag roll 20, the bags are interconnected such that a bottom edge 24 of a leading bag is connected to a top edge 23 of a trailing bag in the bag roll 20, in contrast to bag rolls in which bottom edges or top edges of adjacent bags are interconnected. The side edges 22 are shown as each having an outline that may include a straight segment 22A adjacent to the top edge 23, a tapering segment 22B, and another straight segment 22C. The straight segment 22C extends from the tapering segment 22B to the bottom edge 24 of the bags. Though the moniker "straight" is used for segment 22C, the side edges may taper, from a maximum dimension of WC. The expression "straight segment 22C" is used herein for differentiating purposes, in a non-limitative manner. Accordingly, the bags may have three different separate sections, namely a larger hooking section 20A, a tapering section 20B, and a narrower disposal section 20C, from top to bottom of the bags, such as bag 20'. In an embodiment, the bags are without the tapering section 20B, and thus transition directly from the larger hooking section 20A to the narrower disposal section 20C. The straight segments 22A, although shown as being parallel to one another, may taper toward the bottom edge 24. Likewise, the straight segments 22C, although shown as being parallel to one another, may taper toward the bottom edge 24. As yet another embodiment, the side edges 22 may taper continuously from the top edge 23 to the bottom edge 24, at a continuous angle, or with two different angles, i.e., one for section 20A and another for section 20C, with no section 20B. In another embodiment, the bag 20' (whether or not part of the roll 20) has the straight segments 22A parallel or quasi-parallel to one another, to then taper beyond the larger hooking section 20A. In yet another embodiment, the bags of the bag roll 20 may be straight from the top edge 23 to the bottom edge 24, with a constant width, as in FIG. 7. For clarity, the width described herein is the flat width as in FIG. 1, i.e., with the bags of the roll in a flattened two-fold condition with the panels 21 coplanar. The larger hooking section 20A has a width WA that is greater than a width WC of the narrower disposal section 20C, i.e., WA>WC. Widths WA and WC may be constant throughout most or all of the sections 20A and 20C, respectively, if the segments 22A and 22C are parallel as in FIGS. 1 and 2. If the segments 22A and 22C taper toward the bottom edge 24, the larger hooking section 20A has a minimum width WA that is greater than a maximum width WC of the narrower disposal section 20C. For example, the width ratio is as follows: 0.60WA≤WC≤0.95WA. In another embodiment, the width ratio is as follows 0.65WA≤WC≤0.85WA. In an embodiment, the segments 22A are parallel to one another, whereas the segments 22C taper toward the bottom edge 24.

The bags, such as bag 20A, have a length L that may be segmented as LA, LB and LC, to be representative of the height of sections 20A, 20B and 20C, respectively. In accordance with an embodiment, LC is at least twice the length of LA, i.e., LC>2LA. In accordance with another embodiment including the tapering section 20B, LC is at least twice the length of the combination of LA and LB, i.e., LC>2(LA+LB). LA may be separated into LA1 and LA2 if the top edge 23 defines a concavity or convexity as detailed below. LA2 is the portion of the section 20A below such concavity or convexity.

Figure 6A:
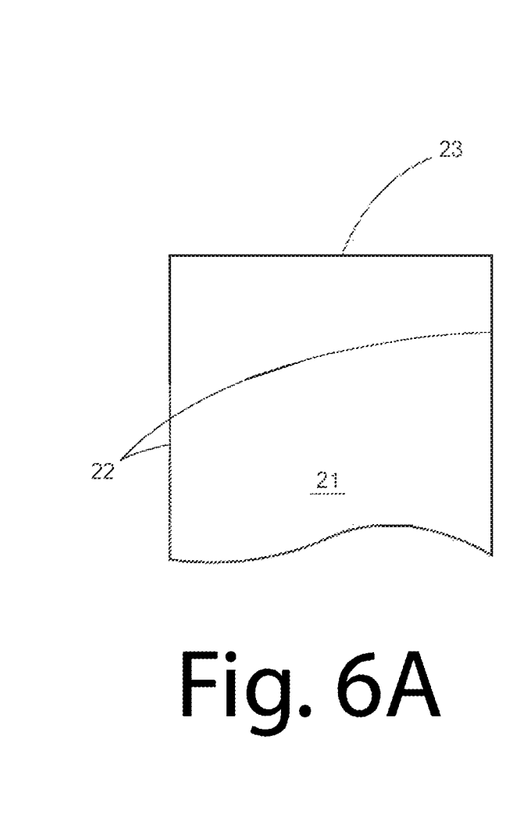
FIGS. 6A to 6C are plan views of top edge outlines for bags of the bag roll of FIG. 1.
Figure 6B:
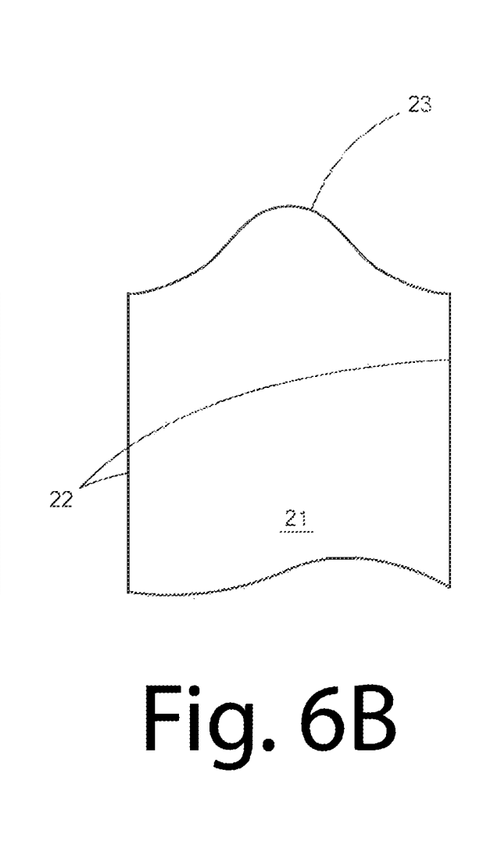
Figure 6C:
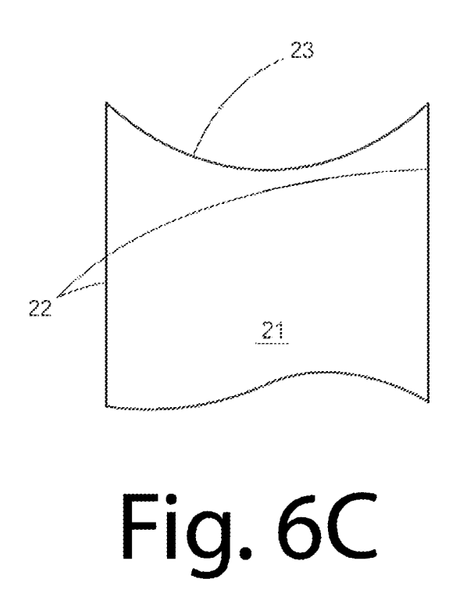

Still referring to FIGS. 1 and 6A to 6C, the top edge 23 may have different outlines. In FIG. 1, the outline of the top edge 23 is a concave sine waveform segment. Other outlines are shown in FIGS. 6A to 6C, such as (A) a straight segment, (B) a convex sine waveform segment, (C) a concave triangle waveform segment. As the bags of the roll 20 are a pair of overlaid panels 21 as in FIG. 1, when the panels 21 are separated from one another to open the bag at the top edge 23, the non-straight outlines of FIGS. 1, 6B and 6C, each form a pair of flaps that may be used to form a knot to attach the bag closed. As the bags are interconnected end to end in the bag roll 20 with adjacent bags connected bottom to top as described above, the bottom edge 24 has a shape that is complementary to the top edge 23. Stated differently, if the outline of the top edge 23 is a concave sine waveform, the bottom edge 24 is a convex sine waveform, etc.

In order to give the side edges 22 the shape described above, a continuous seam 25 may extend from one of the side edges 22 to the other to connect the panels 21 laterally. This continuous seam 25 includes a portion that defines the bottom closed end of the bags 20', 20", etc. Alternatively, the bags may have separate weld seams 25, i.e., the one(s) for the side edges 22 and the one for the bottom closed end. For simplicity, the expression "weld seams 25" is used in the plural, though a single continuous seam 25 may be present, in a U shape for example. The weld seams 25 may be interpreted as weld seam segments of a continuous weld seam 25. The seam 25 may be created by any appropriate welding or adhering method, such as heat welding, etc, whereby reference is made herein as a weld seam, although other types of jointing is contemplated, such as gluing. The weld seam 25 may also connect the panels 21 to define the bottom edge 24, i.e., the closed bottom end of bags of the bag roll 20. The weld seam 25 may also extend to the top edge 23, although in FIG. 1, the weld seam 25 ends at the larger hooking section 20A. In the embodiment of FIG. 1, the straight segments 22A of the larger hooking section 20A are the two folds in the tubular film as described above for the flattened two-fold condition, the folds defining a boundary between the panels 21. Therefore, in accordance with an embodiment, the weld seam 25 is made periodically in a straight continuous tube—a continuous tubular body—in a flattened two-fold condition, and portions of the film laterally outside of the weld seam 25 may be cut out to define the shape of FIG. 1. In an embodiment, there is no such cut out, as the tubular film may remain present in spite of the weld seam 25 forming the narrower disposal section 20C.

Tear-off perforation lines 26 are punctured at the junction between the bottom edge 24 of a first bag, the leading bag such as 20', and the top edge 23 of the subsequent bag in the bag roll 20, the trailing bag such as 20". The tear-off perforation line 26 may be defined by a series of spaced-apart punctures along an outline emulating that of the bottom edge 23 and the top edge 24. The tear-off perforation line 26 is adjacent to the weld seam 25, and forms a weakened portion of the bag roll 20, causing a separation of one of the bags, such as 20' in FIGS. 1 and 2, as a result of a tearing action. In an embodiment, the tear-off perforation lines 26 and cut outs at the sides of the weld seams 25 are done by die cutting.

Referring to FIG. 3, the bag roll 20 may be inserted into a cassette body 40, being for example a receptacle from the bag roll 20. The cassette body 40 may have a slit 41 or like opening, such as a top opening, through which a free end of the bag roll 20 extends. The cassette body 40 is shown as having a cuboid geometry, although other shapes are considered as well, such as a rectangular prism, a cylinder, etc.

Figure 4:
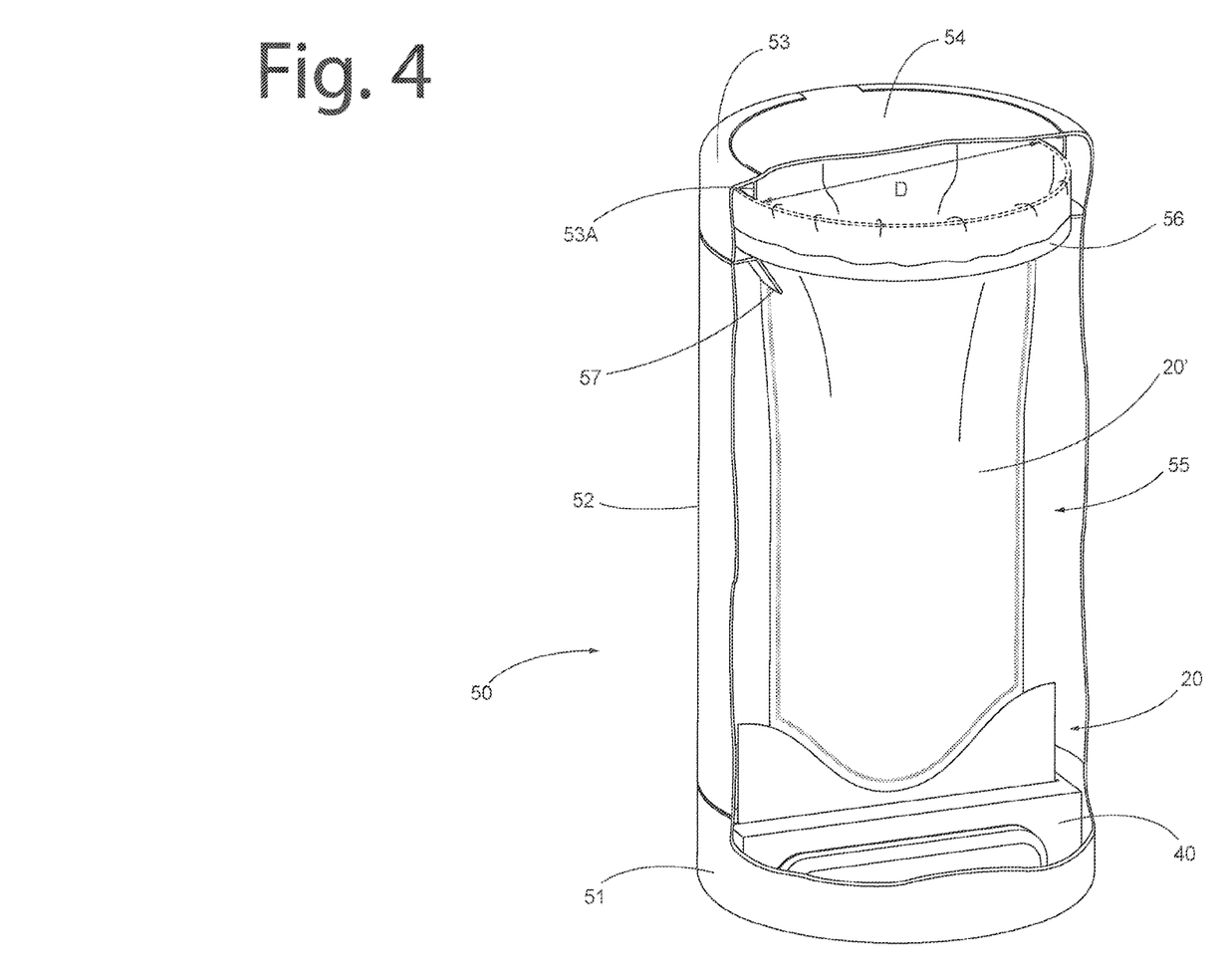
FIG. 4 is a perspective view of the bag roll cassette of FIG. 3 in a fragmented waste-disposal unit.
Figure 5:
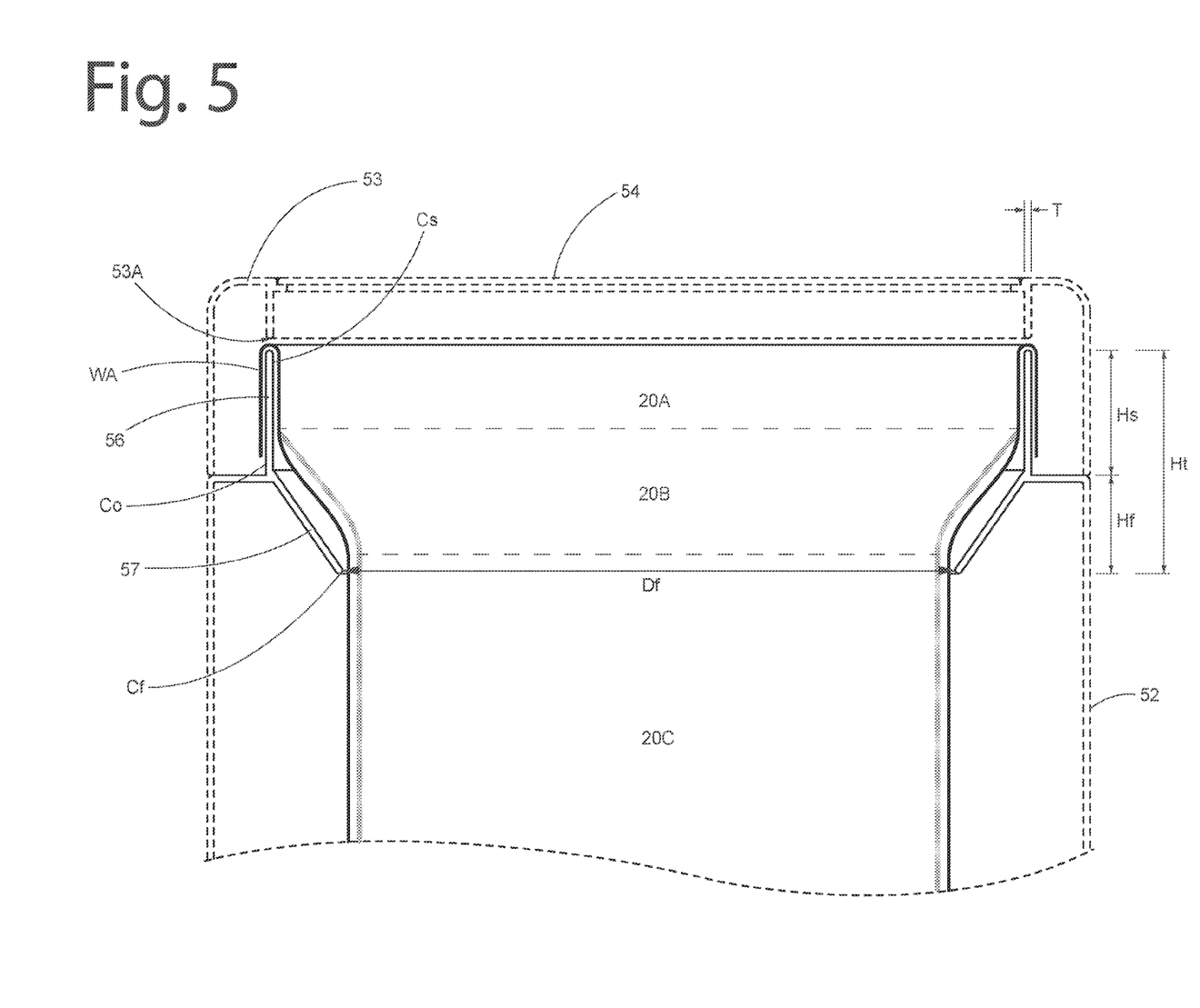
FIG. 5 is a sectional view of the bag roll cassette and waste-disposal unit of FIG. 4.

Referring now to FIGS. 4 and 5, the bag roll 20 as part of the cassette 10 (FIG. 4), or as a bag roll 20 alone (FIG. 5), i.e., without the cassette body 40, is received in a disposal unit 50. The expression "disposal unit" is used herein as encompassing a garbage, a diaper pail, a compost, a recycling bin, a litter pail, etc. The disposal unit 50 may have a base 51, upon which projects an upstanding wall(s) 52. The upstanding wall 52 is in the form of a cylindrical tube in FIG. 4, but may have other shapes, with for example a square section, an oval section, etc. Although not shown, a hinged door may be part of the upstanding wall 52 to provide access to an interior of the disposal unit 50. As another possibility, the upstanding wall 52 may be raised out of engagement with the base 51. Various connection configurations may be present, such as quick connect mechanisms, fasteners, etc. A cover 53 is mounted atop the upstanding wall 52. The cover 53 may define a central opening with a downwardly projecting rim 53A that may come into close proximity or in contact with a bag to ensure the bag remains hung to the disposal unit 50, as in FIG. 5. Moreover, the central opening of the cover 53 shown in FIG. 4 may be shut closed by a trap door 54 (also known as lid), hinged to a remainder of the cover 53. 53A The trap door 54 opens or closes the top access to an inner cavity 55 of the disposal unit 50. It may be biased by a spring, or operated by a pedal mechanism, etc. Also, although not shown, a closing mechanism of any appropriate form (translation, rotation) may be provided in the inner cavity 55 or other location on the disposal unit 50 to squeeze the bag shut.

The disposal unit 50 has a tubular bag support 56 adjacent to the cover 53. In an embodiment, the annular bag support 56 may have any appropriate shape, and is shown as being cylindrical, with a circular cross-section. Other possible cross-sectional shapes include, non-exhaustively, square, rectangular, oval, squircle, pentagon, hexagon, octagon, etc. Accordingly, the expression "tubular" in tubular bag support 56 covers these multiple shapes. The tubular bag support 56 has a height $H_S$, an inner circumference $C_S$, an outer circumference $C_O$ and a wall thickness T. In the embodiment of FIG. 4, in which the tubular bag support 56 is circular, the inner diameter is $D_S$, and the inner circumference $C_s$ is equal to $\pi D_s$. The outer circumference $C_O$ may be expressed as $\pi(D_S+2T)$. In another embodiment, the disposal unit 50 has two or more hooks acting as bag support 56. FIG. 5 may be interpreted as having two elongated straight or curved hooks 56 shown in cross section.

A funnel 57 is located below the tubular bag support 56 in the upstanding orientation of the disposal bin 50. The funnel 57 has a central opening that may have the same shape as the tubular bag support 56. Therefore, in FIG. 4, the funnel 57 has a frusto-conical shape with a central circular opening have a circumference $C_F$ and inner diameter $D_F$. The height of the funnel 57 is shown as being $H_F$. In an embodiment, the funnel 57 is immediately below the tubular bag support 56, whereby a height $H_T$ from a top edge of the tubular bag support 56 to the edge of the central opening of the funnel 57 is as follows: $H_T=H_F+H_S$. In an embodiment, the funnel 57 is spaced apart from the tubular bag support 56, whereby $H_T$ may include the spacing value along a vertical axis of the bin 50. The funnel 57 centers waste or like items deposited into the deployed bag, for the bag to remain generally compact when filled. The funnel 57 may therefore facilitate the removal of the filled bag from the top of the disposal unit 50, i.e., by an upward pull of the user.

As observed in FIGS. 4 and 5, the bag roll cassette 10 or bag roll 20 are disposed in a bottom of the disposal unit 50. In an embodiment, a connection configuration is provided for the bag roll cassette 10 or the bag roll 20 to be retained by the base 51, although the bag roll cassette 10 or the bag roll 20 may simply be deposited on the base 51 and remain in the bottom of the disposal unit 50 by gravity. The free end of the bag roll 20 extends upwardly, for the larger hooking section 20A of the bag 20' to be partially folded over the tubular bag support 56. In doing so, the top open end of the bag 20' is held open, for objects to be dumped into the bag 20'. A remainder of the bag 20', including narrower disposal section 20C, extends into the inner cavity 55 of the bin 50. While the bag 20' is attached to the tubular bag support 56, it remains connected to the bag roll 20 as shown in FIG. 4.

In order for the bag 20' to remain hung to the tubular bag support 56, the bag 20' may have a given unstretched transverse flattened two-fold width WA at its top end, expressed as follows: $C_O/2 \leq WA \leq 1.05(C_O/2)$.

If the tubular bag support 56 is circular, the bag 20' will adopt a circular shape when hung to the tubular bag support 56, as in FIG. 4. The diameter D of FIG. 4 at the opening of the bag 20' can be expressed as $(C_S/\pi+2T) \leq D \leq 1.05 \ (C_S/\pi+2T)$. If the bag is not circular when deployed open, the bag may comply with the following relation: $\pi/2 \ (C_S/\pi+2T) \leq WA \leq 1.05 \ \pi/2 \ (C_S/\pi+2T)$, for the unstretched transverse flattened two-fold width WA. The latter relation may be for the bag as in FIG. 7, for example.

In an embodiment, as in FIG. 5, it is desired that the narrower disposal section 20C of the bag 20' be located in line or below the bottom edge of the funnel 57. Indeed, the narrower disposal section 20C is configured to facilitate removal of a filled bag by upward pull in spite of the presence of the funnel 57 and closing mechanism (not shown). Accordingly, the bags of the roll 20 may comply with $(LA+LB)>H_T+H_S$. The bags of the roll 20 may also comply with $1.5\ H_S \leq LA2 \leq 2\ H_s$ in the case of the bags having the outlines of FIGS. 1, 6B and 6C, such that the subsection of length LA2 of section 20A of the bags covers at least half of the outer circumference of the tubular bag support 56 when taut. If the bags have the outline of FIG. 6A, the bags of the roll 20 may also comply with $1.5\ H_S \leq LA \leq 2H_S$ such that the section 20A of the bags covers at least half of the outer circumference of the tubular bag support 56 when taut.

Because of the funnel 57, the bags of the roll 20 may have a given unstretched transverse flattened two-fold width WC, expressed as follows: $WC \leq C_F/2$. Therefore, even when filled with objects, the bags of the roll 20 may be pulled out of the bin 50 from the top, i.e., through the funnel 57 and tubular bag support 56. In doing so, a subsequent bag in the bag roll 20 is pulled upward and its top end is generally aligned with the tubular bag support 56 when the filled bag exits the bin 50 from the top. The filled bag is detached from the roll of bags 20 once out of the bin 50, and the subsequent bag in the roll 20 is hung to the tubular bag support 56 in the manner shown in FIG. 5.

It is pointed out that the bag roll cassette 10 and/or the bag roll 20 may be used in any other disposal unit, with or without the same components as the disposal unit 50 of FIGS. 4 and 5. The disposal unit 50 is provided as an exemplary bin configuration adapted to be used with the bag roll cassette 10 and/or the bag roll 20, yet it is clear that variants of the disposal unit 50 can be used with the bag roll cassette 10 and/or the bag roll 20 as well.

Figure 8:
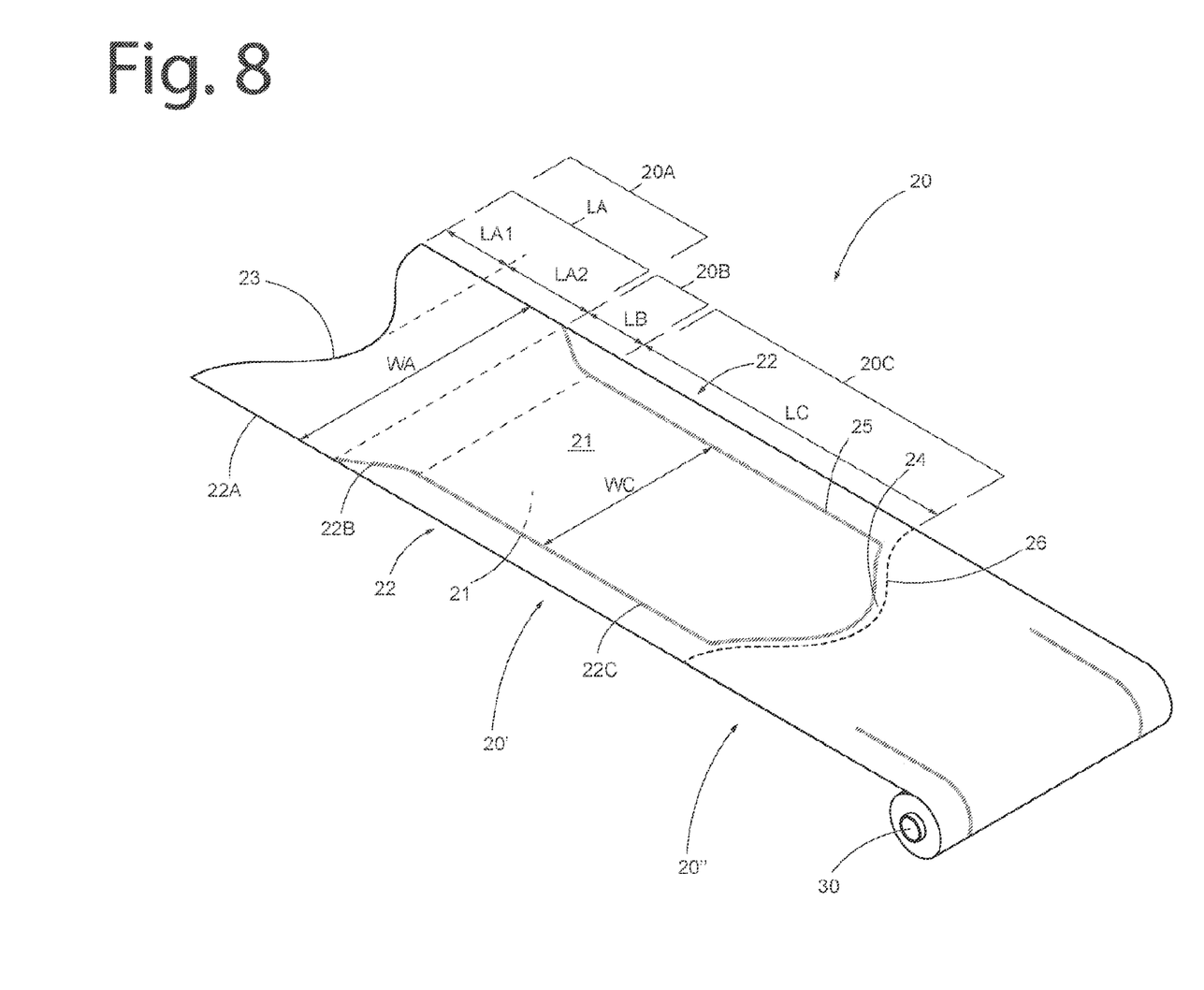
FIG. 8 is a perspective view of a bag roll in accordance with another embodiment of the present disclosure.

Referring to FIG. 8, another embodiment of the bag roll 20 is illustrated. The bag roll 20 is similar to the bag roll 20 of FIG. 1, though without any cut outs at the sides of the weld seams 25. Accordingly, when laid flat as in FIG. 8, the bag of the bag roll 20 has a constant width. For example, the side edges 22 are parallel to one another on the full length of the bags from the bag roll 20. However, due to the presence of the weld seams 25, the dimension of the inside of the bag at WC—for instance in terms of inside diameter—is the same as in the embodiment of FIG. 1. Indeed, as the open bag has an inner narrowing due to the presence of the weld seams 25, the open diameter of the bag of FIG. 8 is similar to that of the bags of FIG. 1. Flaps are formed to the exterior of weld seams 25. For example, the width ratio is as follows: $0.60WA \leq WC \leq 0.95WA$. The description provided above for the bag roll 20 of FIG. 1 extends to the bag roll 20 of FIG. 8, with the exception of the cutouts at the weld seam. In all embodiments described herein, there may be a single side portion for the weld seam 25 (i.e., only one extending along the side edges 22) as opposed to the two side portions shown in the figures, and yet achieve the narrowing described herein. The bag 20' of FIG. 8—or of all figures—may also come as individual units, i.e., not as part of a bag roll.

Figure 9:
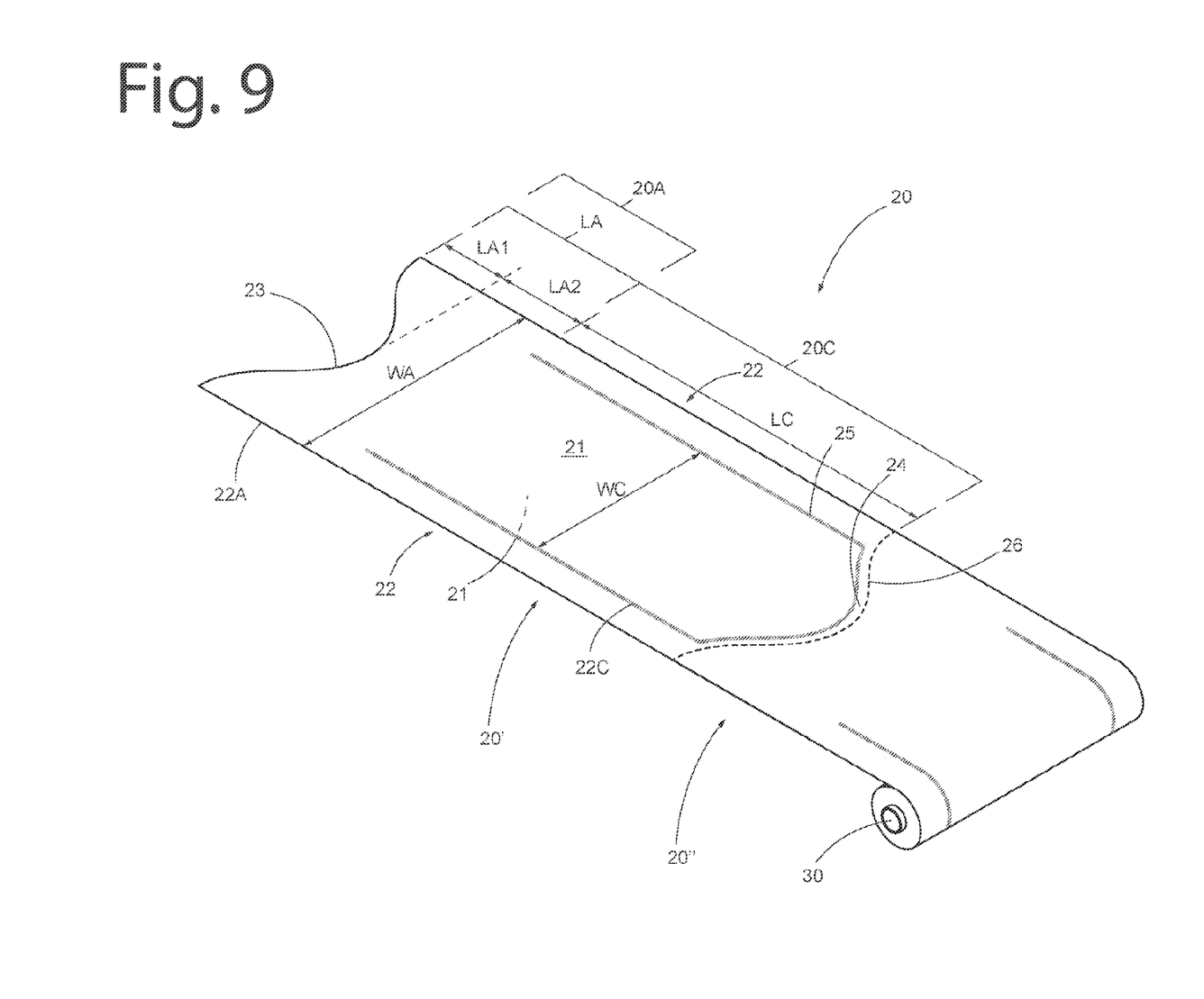
FIG. 9 is a perspective view of a bag roll in accordance with another embodiment of the present disclosure.

Referring to FIG. 9, another embodiment of the bag roll 20 is illustrated. The bag roll 20 is similar to the bag roll 20 of FIG. 8, though without the weld seams 25 forming the tapering section 20B. When laid flat as in FIG. 9, i.e., in a flattened two-fold condition, the bags 20', 20'', etc, of the bag roll 20 have a constant width. For example, the side edges 22 are parallel to one another on the full length of the bags from the bag roll 20. However, due to the presence of the weld seams 25, the dimension of the inside of the bag at WC—for instance in terms of inside diameter—is the same as in the embodiment of FIG. 1. There is a step formed by the weld seams 25, resulting in a reduction in the open diameter, at the transition between section 20A and section 20B. Indeed, as the open bag has an inner narrowing due to the presence of the weld seams 25, the open diameter of the bag of FIG. 8 is similar to that of the bags of FIG. 1. For example, the width ratio is as follows: $0.60WA \leq WC \leq 0.95WA$. The description provided above for the bag roll 20 of FIG. 1 extends to the bags of the bag roll 20 of FIG. 9, with the exception of the cutouts at the weld seam. The bag 20' of FIG. 8—or of all figures—may also come as individual units, i.e., not as part of a bag roll.

The invention claimed is:

1. A bag comprising
    a tubular body with a top open end and a bottom closed end,
    the tubular body having a larger open diameter at the top open end, and a narrower open diameter at the bottom closed end, the tubular body narrowing from the larger open diameter proximate to the top open end, and
    the tubular body in a flattened two-fold condition having a pair of side edges extending from a top edge in a direction of a bottom edge, the top edge delimiting the top open end, the bottom edge delimiting the bottom closed end, the pair of side edges being generally parallel to one another from the top open end to the bottom closed end, and delimiting an interior of the tubular body,
    wherein at least one weld seam defines the narrower open diameter, and
    wherein at least one flap is defined between the at least one weld seam and at least one of the side edges, the at least one flap being excluded from the narrower open diameter.

2. The bag according to claim 1, including a pair of the at least one weld seam.

3. The bag according to claim 2, further including a pair of the at least one flaps.

4. The bag according to claim 1, wherein the tubular body is made of at least two layers of film.

5. The bag according to claim 4, wherein at least one of the layers is an ethylene vinyl alcohol.

6. The bag according to claim 4, wherein at least one of the layers is made of at least one of polyethylene, bioplastic, polyactic acid, starch-base, plant-base.

7. The bag according to claim 1, wherein a relation between the flattened two-fold width WA of the larger open diameter and the flattened two-fold width WC of the narrower open diameter is expressed as $0.60WA \leq WC \leq 0.95WA$.

8. A bag roll comprising:
    a plurality of the bag according to claim 1, wherein the bags are connected end to end and from the bottom edge of a first of the bags in the bag roll, to the top edge of a second of the bags in the bag roll.

9. The bag roll according to claim 8, wherein the bag roll is in a receptacle of a cassette body, a free end of the bag roll exiting the cassette body from a top opening in the receptacle.

10. The bag roll according to claim 9, wherein the bags are made of a continuous tubular body separated by a weld seam and a tear line at a bottom edge of each of the bags.

11. The bag roll according to claim 8, including a pair of the at least one weld seam.

12. The bag roll according to claim 11, further including a pair of the at least one flap.

13. The bag roll according to claim 8, wherein the tubular body is made of at least two layers of film.

14. The bag roll according to claim 13, wherein at least one of the layers is an ethylene vinyl alcohol.

15. The bag roll according to claim 13, wherein at least one of the layers is made of at least one of polyethylene, bioplastic, polyactic acid, starch-base, plant-base.

16. The bag roll according to claim 8, wherein a relation between the flattened two-fold width WA of the larger open diameter and the flattened two-fold width WC of the narrower open diameter is expressed as $0.60 WA \leq WC \leq 0.95 WA$.

* * * * *